United States Patent [19]

Bertram et al.

[11] Patent Number: 5,805,157
[45] Date of Patent: Sep. 8, 1998

[54] MOBILE CLIENT COMPUTER WITH HEXAGONAL KEYBOARD

[75] Inventors: Randal Lee Bertram, Raleigh; David Frederick Champion, Durham; Lisa Salcedo Eichorn, Wake Forest, all of N.C.

[73] Assignee: International Business Machines Corporation, Armonk, N.Y.

[21] Appl. No.: 700,608

[22] Filed: Aug. 12, 1996

[51] Int. Cl.⁶ .................................................. G06F 3/00
[52] U.S. Cl. .......................................... 345/339; 345/168
[58] Field of Search .................................. 395/333, 334; 345/168, 333, 334, 339, 347, 348, 349, 975, 173; 341/22

[56] References Cited

U.S. PATENT DOCUMENTS

| | | | |
|---|---|---|---|
| 5,124,702 | 6/1992 | Van Ardenne | 341/22 |
| 5,415,071 | 5/1995 | Devies | 84/471 SR |
| 5,575,576 | 11/1996 | Roysden et al. | 400/472 |
| 5,625,354 | 4/1997 | Lerman | 341/20 |
| 5,661,635 | 8/1997 | Huffman et al. | 361/684 |

*Primary Examiner*—A. Katbab
*Attorney, Agent, or Firm*—Daniel E. McConnell; Bernard D. Bogdon

[57] ABSTRACT

A computer in which entry of data from an area provided on a display, touchscreen or the like is facilitated by the provision of a "soft keyboard" having keys configurable as hexagonal cells. Hexagonal cells enable display of larger areas for engagement by the finger or other input pointer used by a user of the computer of this invention. A user can be permitted a choice between hexagonal and rectangular cells.

35 Claims, 10 Drawing Sheets

FIG. 8

Candida Form

Main | Back

Candida Bloodstream Infections Multicenter Study

Center  12
Date of birth  04-29-54
Date of admission  04-29-54
Primary ICd9

Hospital number  123456789
Male ○  Female ○
Date admission ICU  04-29-54
Secondary ICd9

Record 1 of 6
Date of surgery
Minutes
ASA score

Type  Access Procedure
Anesthesia
Class  Clean-contaminated
Urgency

FIG. 9

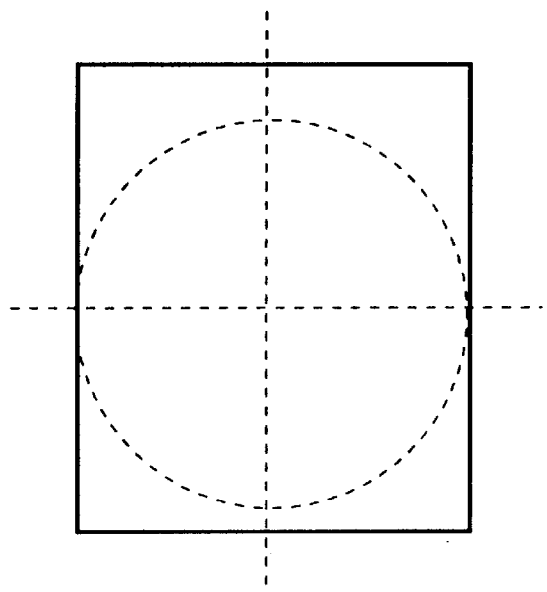
FIG. 10
FIG. 11
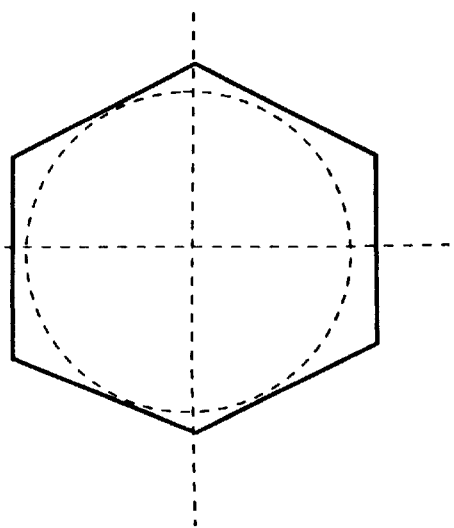
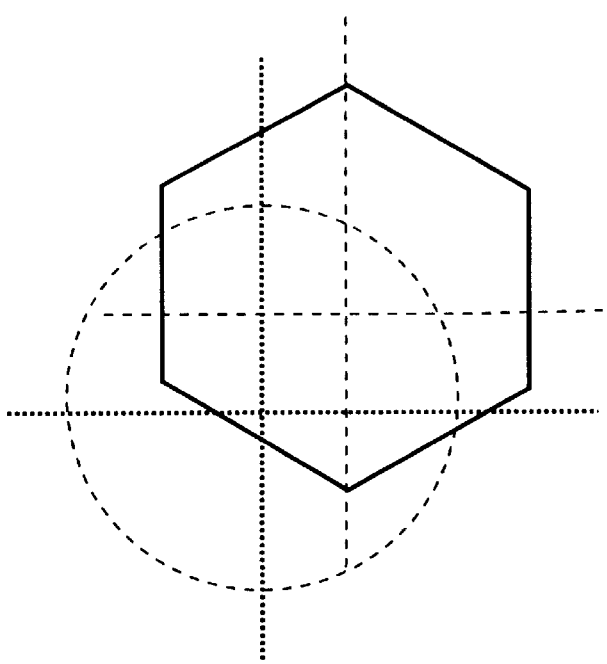
FIG. 12

MOBILE CLIENT COMPUTER WITH HEXAGONAL KEYBOARD

RELATED APPLICATIONS

This application is one of a series of related applications assigned to common ownership. Other applications in the series include:

Application Ser. No. 08/781,004 filed 9 Jan., 1997, entitled "Mobile Client Computer with Keyboard Interface" with named inventors T. Aebli, B. Miller and W. W. Vetter;

Application Ser. No. 08/723,171 filed 22 Aug., 1996, entitled "Mobile Client Computer Programmed to Predict Input" with named inventors R. L. Bertram, D. F. Champion and P. Brittenham;

Application Ser. No. 08/708,168 filed 22 Aug., 1996, entitled "Mobile Client Computer Programmed to Exchange Lists of Predicted Input" named inventors R. L. Bertram and W. T. Oldfield;

Application Ser. No. 08/814,034 filed 10 Mar., 1997, entitled "Mobile Client Computer Interacting with Docking Device" with named inventors E. H. Booth, B. A. Carpenter, R. B. Ferrier, R. A. Resnick and W. W. Vetter;

Application Ser. No. 08/706,990 filed 22 Aug., 1996, entitled "Mobile Client Computer Programmed to Copy Lists of Predicted Input" with named inventors R. L. Bertram, P. J. Brittenham and D. F. Champion;

Application Ser. No. 08/813,148 filed 7 Mar., 1997, entitled "Mobile Client Computer Programmed for Systems Message Display" with named inventors R. L. Bertram and D. F. Champion;

Application Ser. No. 08/873,522 filed 7 Mar., 1997, entitled "Mobile Client Computer Programmed to Process Table Displays" with named inventor R. L. Bertram;

Application Ser. No. 08/807,969 filed 3 Mar., 1997, entitled "Mobile Client Computer Programmed to Combine Cursor, Control and Input Functions" with named inventors P. J. Brittenham and L. D. Comerford;

Application Ser. No. 08/813,527 filed 3 Mar., 1997, entitled "Mobile Client Computer Programmed to Display Drop Down Scrolling Indicator" with named inventors R. L. Bertram and D. F. Champion;

Application Ser. No. 08/813,521 filed 7 Mar., 1997, entitled "Mobile Client Computer Programmed to Hide Empty Table Elements" with named inventor R. L. Bertram.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

Computers often present a "soft keyboard" to the user. The soft keyboard is typically an on-screen representation of a physical keyboard with alphanumeric characters and other controls. The following soft keyboards all use rectangular regions for "keys":

A desktop computer displays a soft keyboard on the monitor which the user operates with the mouse. This is most useful for small keyboards such as a number pad.

A tablet computer displays a soft keyboard which the user operates with a stylus. The tablet may rely exclusively on the soft keyboard for keyboard input, not providing a physical keyboard.

A mobile client computer system displays a soft keyboard which the user operates by touch, similar to a traditional keyboard.

A system gets input from a touch pad which does not overlay a display. The "keys" are permanent designs on the touch pad's surface. This is a soft keyboard since there are no mechanical keys.

The problem presented in each instance is that rectangular keys waste space in a soft keyboard. The above systems only use the central portions of the rectangles, not the corners. A user's finger, mouse or stylus distributes the probable points of selection radially from the center. With a rectangularly shaped "key region", the probable points of selection are still arrayed in a substantially circular form.

Wasted space in soft keyboards is a serious problem, especially on small screens such as are provided in mobile client systems and especially when there are a lot of keys (e.g. alphanumeric keyboards). One example of such wasted space is shown in FIG. 10. Hence, soft keyboards need another shape for keys besides the rectangle. The new shape must have the following properties:

The new shape should approximate a circle or ellipse as closely as possible. It should avoid ninety degree corners like a rectangle since this is what wastes space.

The new shape should interlock so that space between the keys is not wasted.

The new shape should have a simple algorithm for testing inclusion of a point. In other words, when the users presses one of the keys, the system must determine which key is pressed without undue overhead.

The new shape should have interlocking polygons which are staggered when interlocked, to allow a QWERTY keyboard to be more accurately represented.

The rectangle meets the third criteria better than any other shape because computer displays and sensor grids have a Cartesian nature. It is simple for an algorithm to determine whether a point is below the top, above the bottom, and between the sides of a rectangle. Any other shape requires regional boundary checking unless the shape is a perfect polygon (with equal sides and angles). In a grid of perfect polygons, an algorithm can determine which shape contains a given point by finding which polygon's center is the closest. For instance, in a grid of squares, a point is always within the square whose center is the closest.

Hence, a perfect polygon is preferred. The square is eliminated by the first criterion. Likewise, the equilateral triangle meets the second and third criteria, but not the first.

The pentagon and octagon both fail the second criterion (they do not interlock). The hexagon is the only perfect shape that meets all four criteria.

SUMMARY OF THE INVENTION

With the foregoing as background, the present invention contemplates a computer in which entry of data from an area provided on a display, touchscreen or the like is facilitated by the provision of a keyboard having keys configured as hexagonal cells. As will be brought out more fully hereinafter, the hexagonal cells enable display of larger areas for engagement by the finger or other input pointer used by a user of the system of this invention.

A system in which the present invention is embodied may be any of the types of systems mentioned above. The hexagonal soft key keyboard is however, particularly useful with a mobile client system of a type to be described hereinafter.

BRIEF DESCRIPTION OF THE DRAWINGS

Some of the purposes of the invention having been stated, others will appear as the following description proceeds, when taken in connection with the accompanying drawings, in which:

FIG. 8 is an illustration of the display screen of the mobile client of FIG. 2 while driven by the execution of an application program on the mobile client to display certain data;

FIG. 9 is an illustration similar to FIG. 8 showing a hexagonal key soft keyboard in accordance with this invention;

FIG. 10 is a schematic illustration of a rectangular key element and a likely "target zone" for user targeting;

FIG. 11 is an illustration similar to FIG. 10 showing a hexagonal key element and an associated target zone; and FIG. 12 is an illustration similar to FIGS. 10 and 11 showing a hexagonal key element and a displaced target zone.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
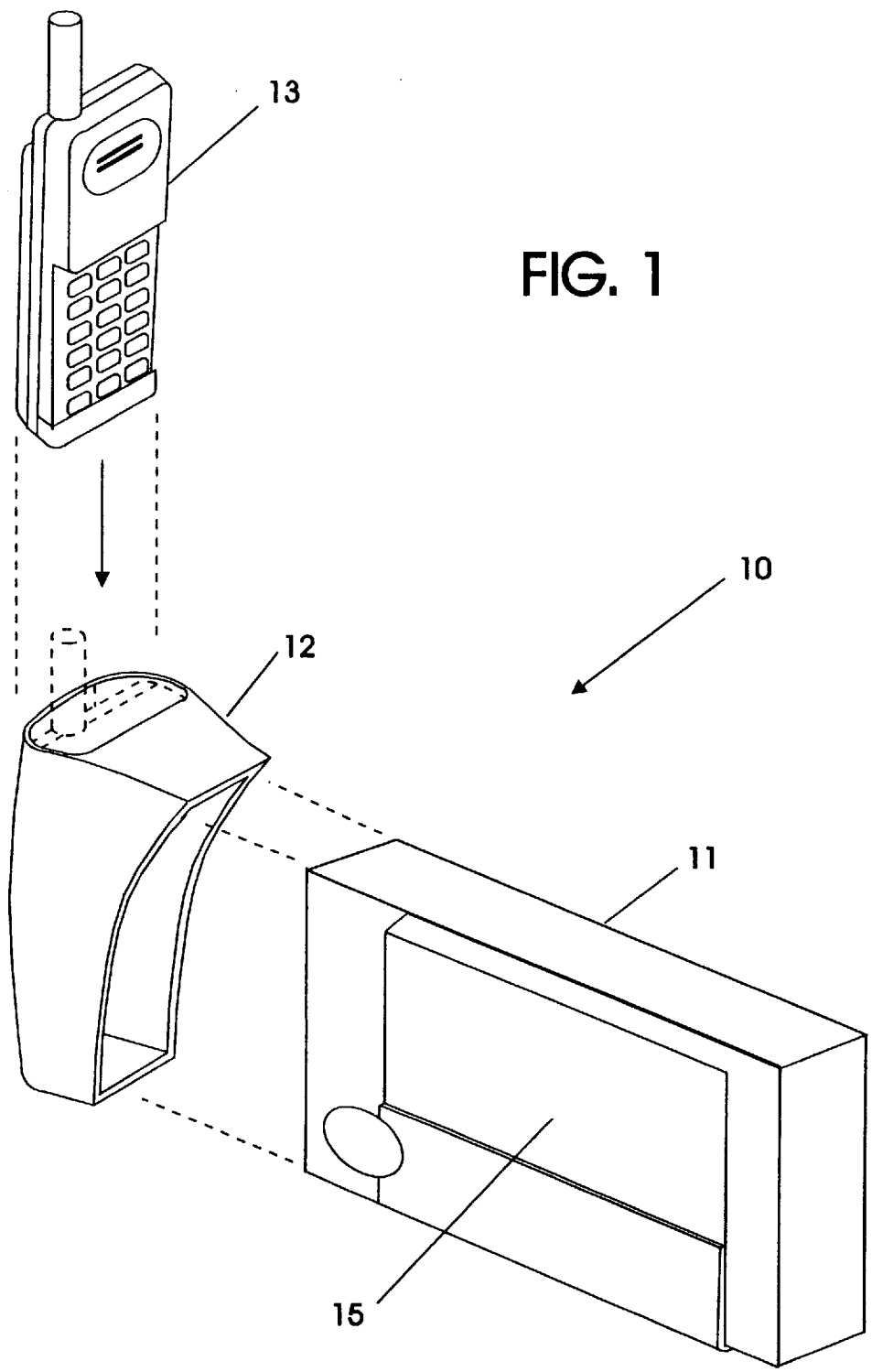
FIG. 1 is an exploded perspective view of certain elements of a mobile client computer system in accordance with this invention.
Figure 2:
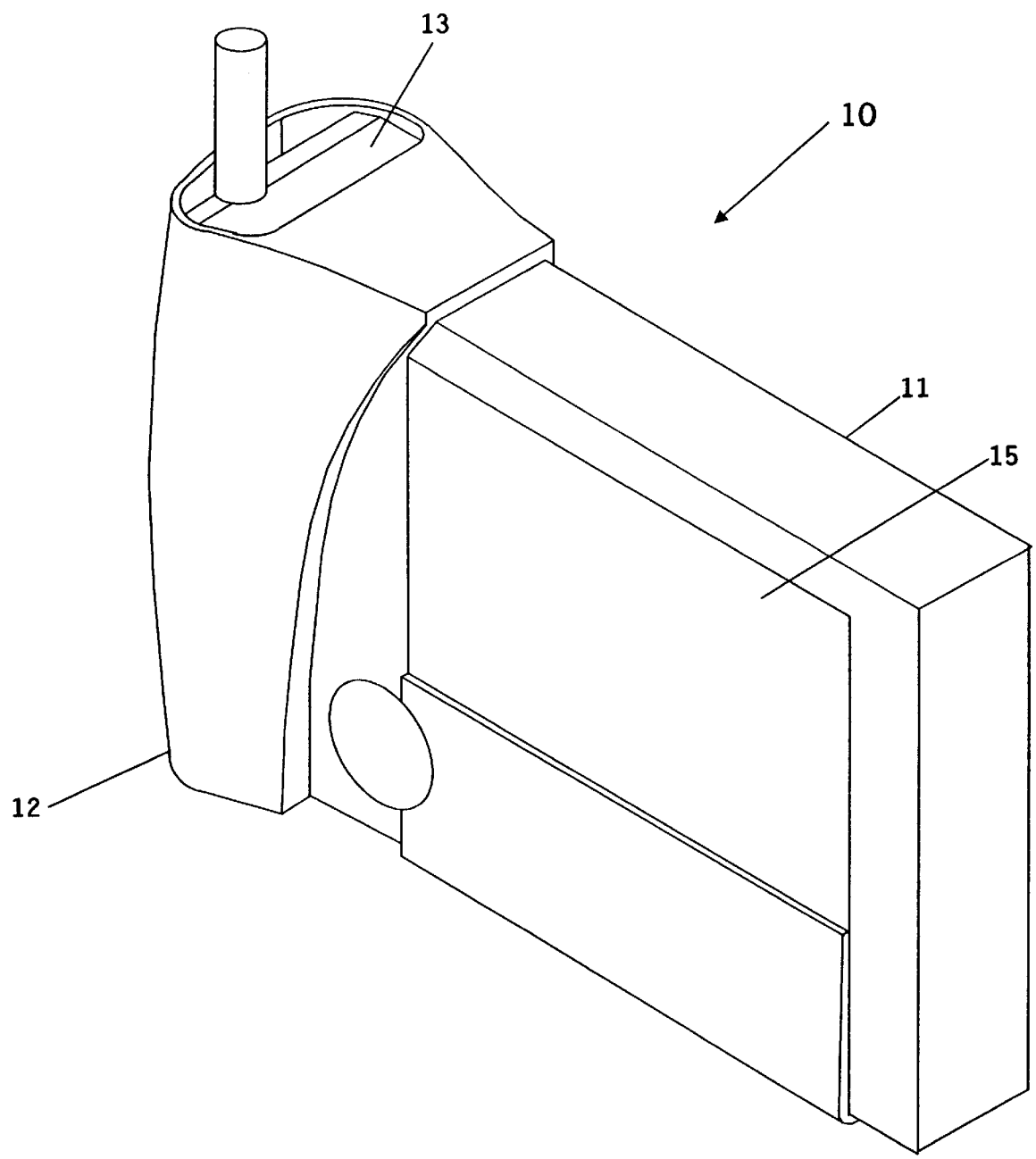
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
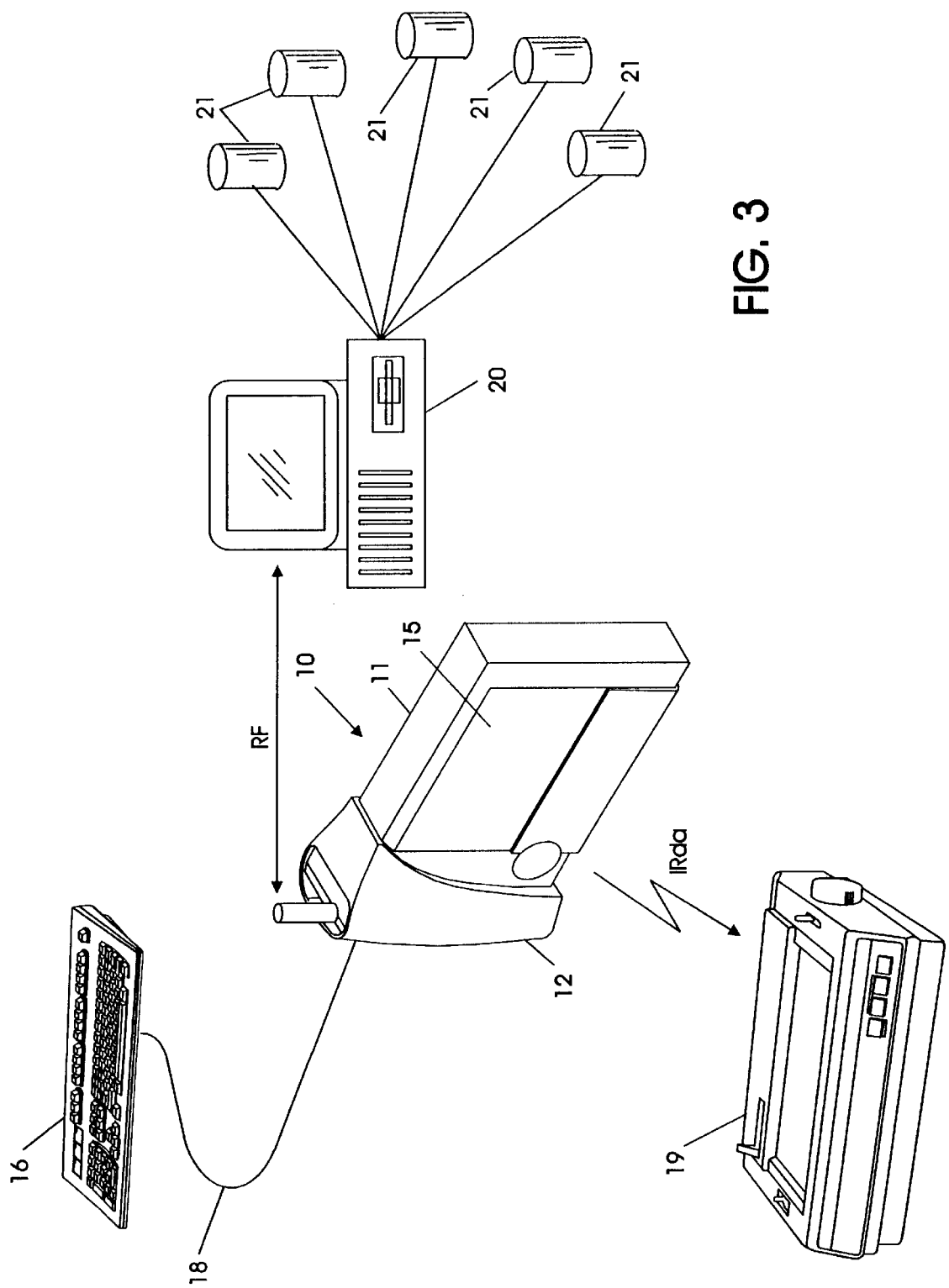
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
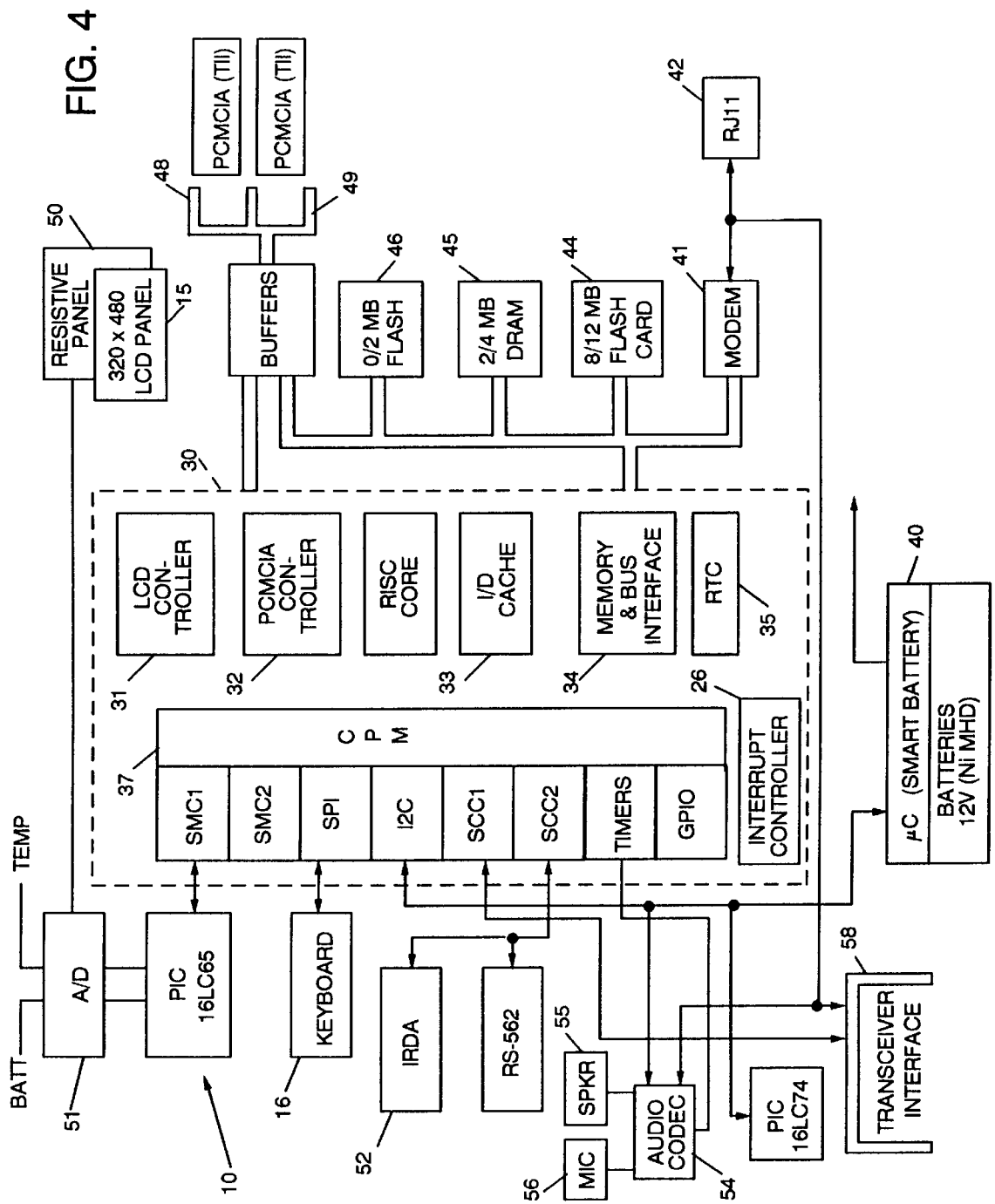
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics. The processor has elements which include a controller 31 for a liquid crystal display; a controller 32 for peripherals of the type known as PCCards or PCMCIA cards; instruction/data cache 33; an interface to memory and an external bus 34; and a real time clock 35. The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM) 45; and by core flash memory 46. Preferably, a pair of PCMCIA slots, of type II, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
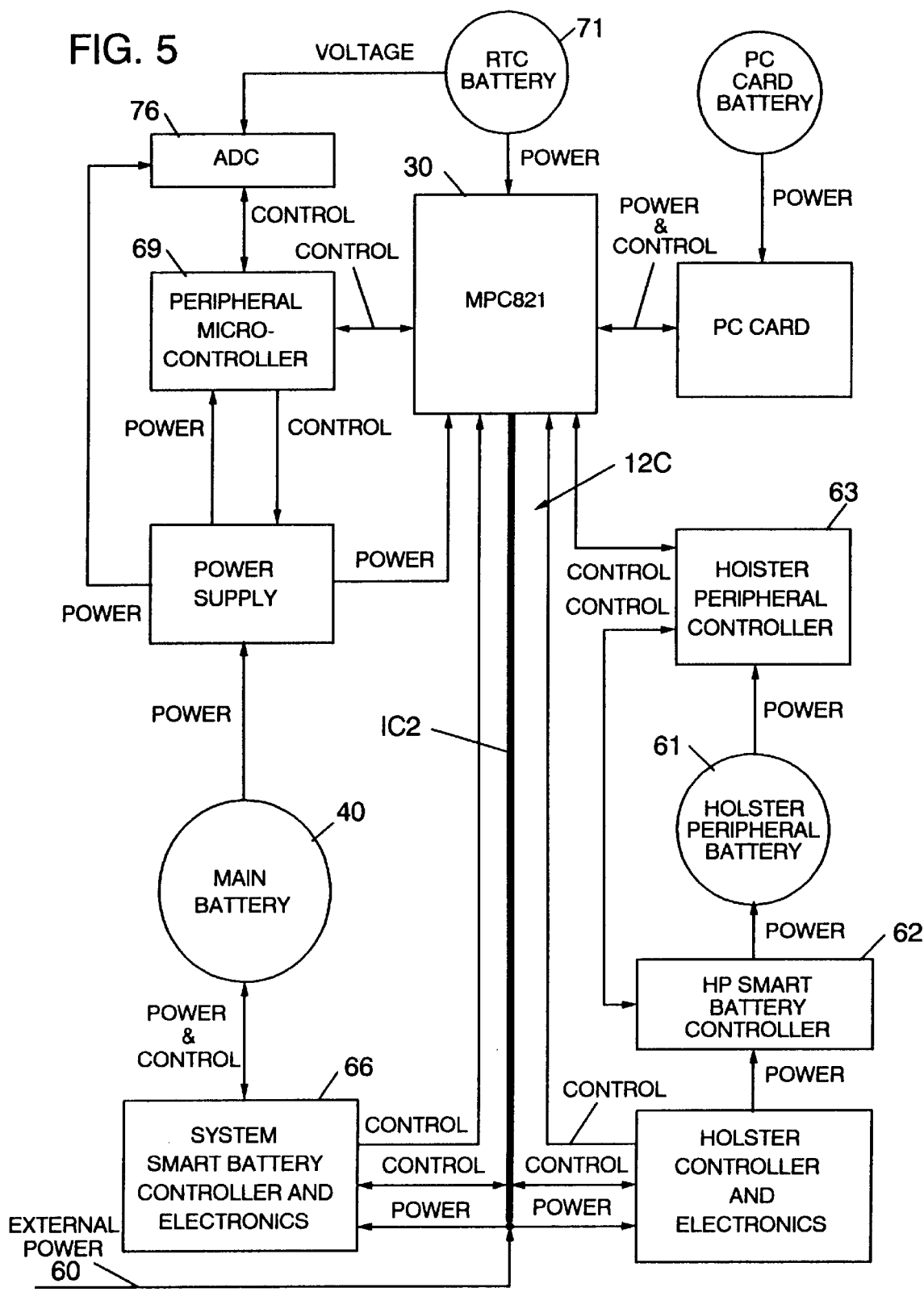
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
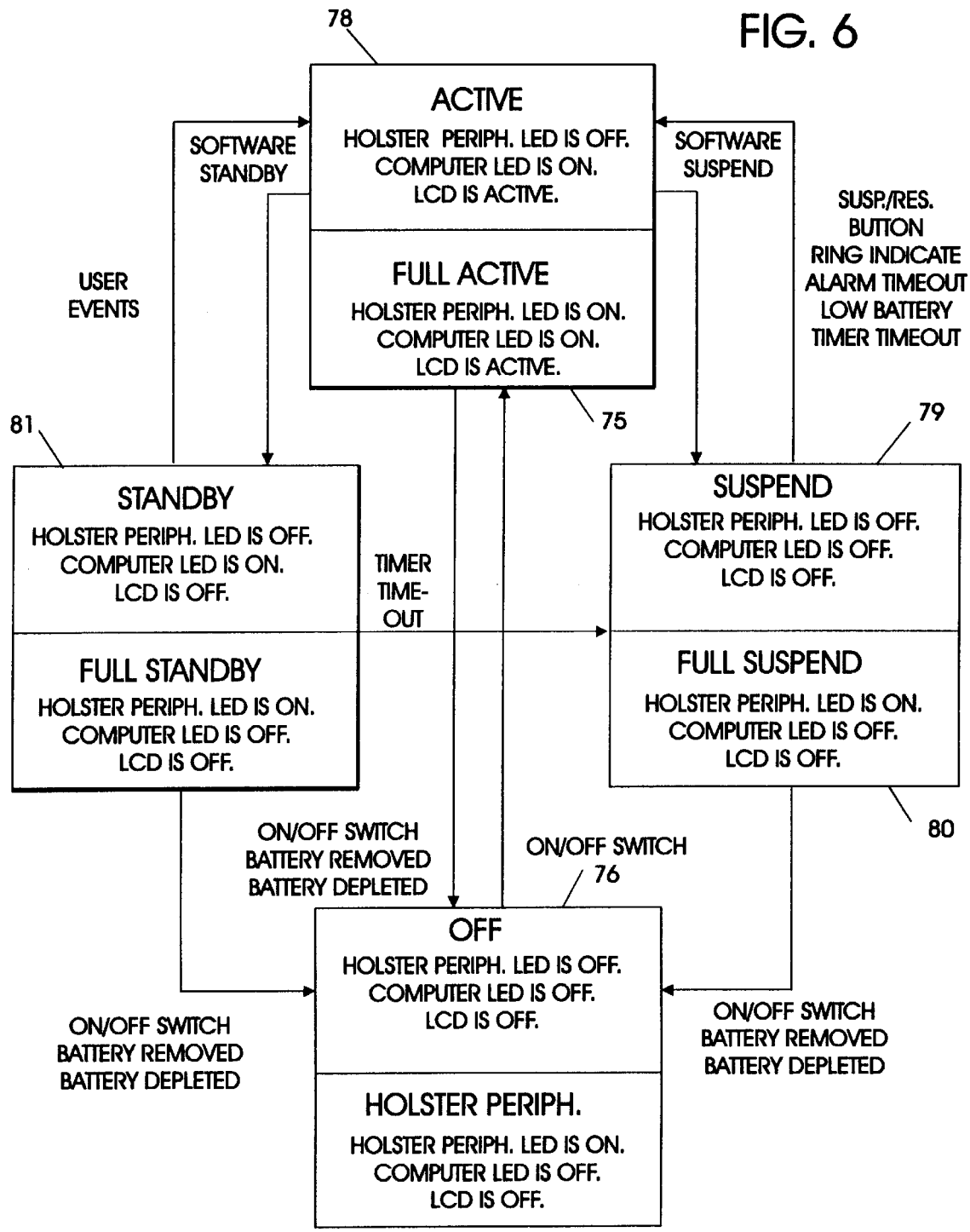
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
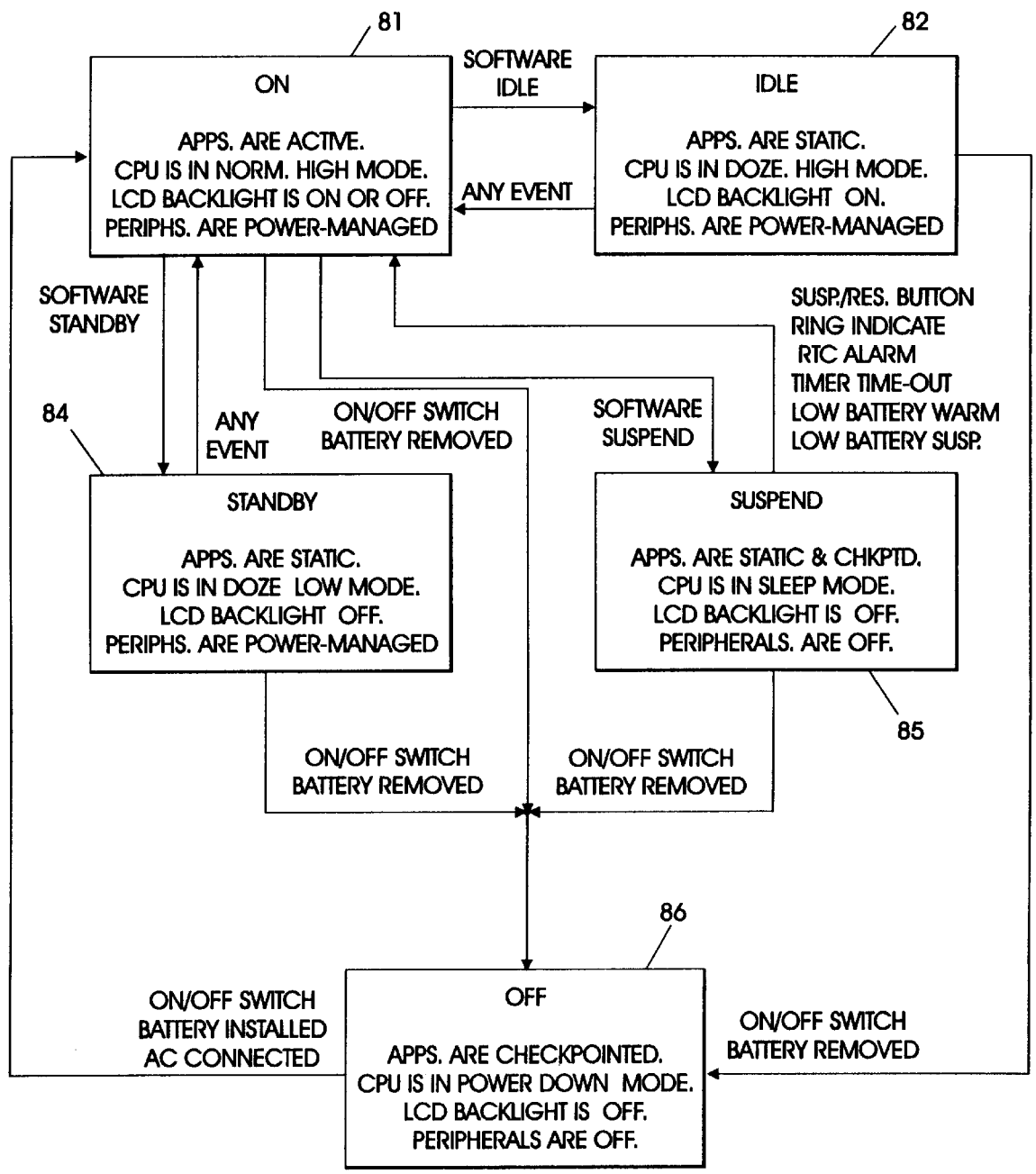
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data. Display of such fields results from execution of a control program by the processor of the mobile client system.

Other and further functions of the control and application programs and the screen display will become more clear from discussion which follows or appears in the above identified related applications.

As will be understood, the area available for display of screens in a mobile client system of the type here described is limited. Such limitations impose severe restrictions on the front of screen technology used in generating displays and in providing for the input of data using a touchscreen overlaying the display area. The present invention contemplates that control programs stored accessibly to the processor of a mobile client system will cooperate with the other elements present, when executing on the processor, in accommodating the restricted display area to the needs of users of the system. This invention focuses particularly on certain of such needs.

Figure 9:
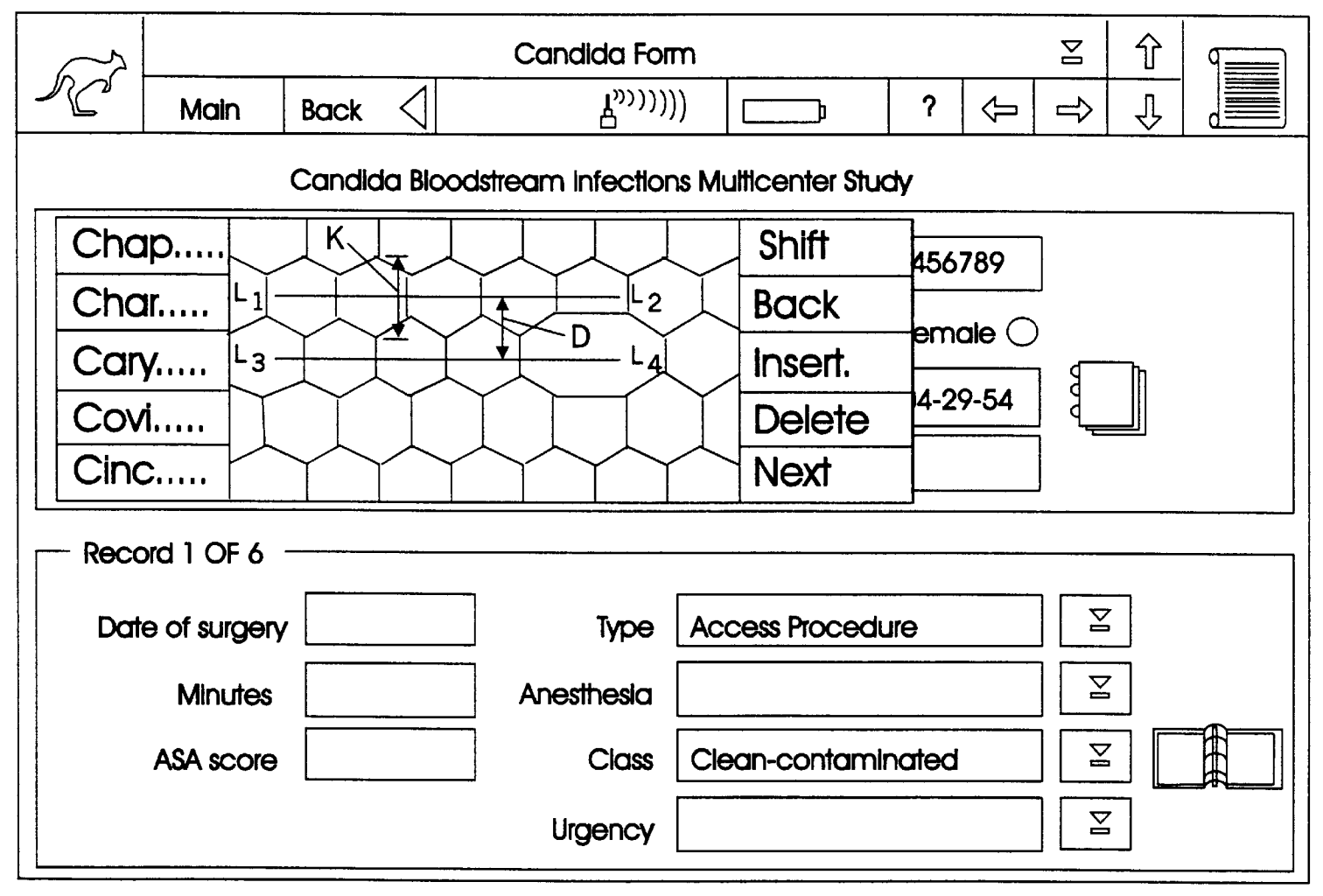

More particularly, the present invention is a hexagonal soft keyboard displayed on the touchscreen as illustrated in FIG. 9 which addresses the need of facilitating entry of data from a small touchscreen area. The arrangement of the keys shown in FIG. 9 is illustrative only, and many other arrangements are possible. The soft keyboard may occupy a window brought up over the remainder of the display when needed for entry of alphanumeric data, may occupy a window which remains in position as a portion of the display at all times, or may occupy the entirety of the available display area during use, depending upon the particular application programs with which the keyboard may interact.

Most of the keys are perfect hexagons, with the exception that the top and bottom row of keys are truncated in order to fit into a rectangle; some keys are "extended" hexagons, such as the "Space" key (this type of key is irregular itself, and also truncates the keys above and below); and the columns of keys on the right and left are rectangular. In this example, keyboard functions are on the right side and the feature field here identified as a "SmartList" is on the left. (The SmartList is a list of values that were previously entered in the current field. In the figure, the user is entering the name of a city and has typed "C." Refer to the related applications mentioned above for further discussion.)

This keyboard saves space over an equivalent rectangular keyboard. It does this by not wasting space on unused corners. As a result of the saved space, the keyboard can be smaller or the characters on the keys can be larger.

Referring now to FIGS. 10 through 12, FIG. 10 illustrates a rectangular key element such as has been employed heretofore. A set of "cross hair" lines indicate the center point of the key element and a circular target zone defined within the element indicates the likely location of targeting by a user seeking to initiate an input using the key element.

The reader is asked to notice that the corners of the rectangular shape are typically avoided. FIG. 11 shows a hexagonal key element with cross hair lines and a circular likely target zone aligned with the key element. The reader is asked to notice that the utilization of the keyboard area is significantly enhanced. That is, there is less inactive space within the key element. FIG. 12 shows a hexagonal key element and a target zone which is displaced from the center of the key element. The centers of the key element and the target zone are indicated by respective sets of cross hairs. The calculation of a target zone offset from the defined key element is the subject matter of a related application not here identified.

The hexagonal key keyboard has a number of advantages. The keys are staggered so that the "H" key is between the "L" and "M" keys. This is an advantage when imitating the traditional QWERTY keyboard which uses staggered keys. The hexagons are oriented with vertices above and below, instead of edges above and below. This gives the letters with extenders and descenders enough vertical space.

A general advantage of hexagons over rectangles is that only three keys surround each vertex, and each key connects to its neighbor by a complete edge. With rectangles, there are four keys surrounding each vertex and keys are connected diagonally by a vertex rather than by an edge. This makes mistakes more likely as users move between keys.

Taking advantage of the last property of hexagons, a polar pointing device (such as a wiggle stick, mouse or trackball) can operate a hexagonal keyboard. The control programs functions to snap a pointer between keys, and can access six adjacent keys from any given starting current location. This is much better than rectangular keys which only offer four adjacent keys.

The hexagonal keyboard in FIG. 9 is implemented as two "planes". One is a Rectangle Plane which is an array that contains rectangle coordinates. There are several rectangles in the keyboard:

a. The rectangles in the columns on the left right side.
b. The rectangles in the extended keys. In the "Space" key in FIG. 9, there is a rectangle defined by the top and bottom vertices of two adjacent hexagons. A hit in this rectangle is the same as a hit in one of the hexagons. The regions of the "Space" key are two hexagons overlaid by a rectangle. The rectangle is in the Rectangle Plane.
c. The rectangles that bound the keyboard on the top and bottom. Hits in these rectangles are discarded because they are outside the keyboard.

The Rectangle Plane is "on top," meaning that if a hit is inside one of the rectangles, the algorithm does not consider the next plane.

The other plane is here called the Center Plane, which is an array of all the central points of the hexagons. If the Rectangle Plane does not interpret a hit, then the algorithm uses the Center Plane. The algorithm determines which hexagon's center is the closest to the hit (point of selection). This defines which hexagon contains the hit. This procedure works for all the area enclosed by each hexagon, both along the edges and in the corners, in a grid of perfect hexagons.

The entire algorithm is quick, simple, and does not require floating point arithmetic. Though the Center Plane involves distances, it only uses the comparisons and not the actual distances, so no square root is necessary. The simplest form of this algorithm calculates $$\text{Distance}=(x\text{Hit}-x\text{Center})^2+(y\text{Hit}-y\text{Center})^2$$

where xHit and yHit are the coordinates of the point of contact, and xCenter and yCenter are the central point of each hexagon. A loop calculates Distance for each hexagonal key, remembering which was the shortest. An alternative, more complex approach performs a binary search along each axis, always moving closer. With either approach, square root calculations are avoided.

The foregoing is a specialized algorithm for determining which hexagon in an interlocking grid contains a point. However, there is a more general algorithm to determine whether a point lies within a polygon. The general method works for any polygon, in addition to interlocking perfect polygons. The general algorithm operates by drawing a line from a point so that it crosses the edges of the polygon. As the line goes away from the point, if it crosses the polygon edges an odd number of times, then the point lies within the polygon. This algorithm is described in "Algorithms" by Robert Sedgewick (Addison Wesley, 1988, 2nd Ed.) And discussed in "Computer Graphics" by Foley, van Damm, Feiner and Hughes (Addison Wesley, 1990, 2nd Ed.). The general algorithm has advantages in that it avoids any requirement that key elements be perfect hexagons (key elements can be elongated horizontally or vertically); hit testing can be performed on an individual key element without requiring tests on other keys (a more modular design); and it is an existing, "off-the-shelf" algorithm readily available in many software environments (and thus need not be specially written).

The advantage of the specialized algorithm is speed. It does not require floating point arithmetic. This is significant where processor speed and power may be limited. The specialized algorithm will work correctly with elongation of a key element, provided that the elongation is less than extreme.

In the form here illustrated and described, invisible hexagons bound the keyboard on the left and right. These invisible keys do not return any value if they are selected. Their purpose is to discard any hits which occur on the left and right of the valid hexagonal keys.

A more generalized, versatile design for keyboards using this invention will divide a keyboard display area into five zones. One will be a Center zone. The other four are bordering zones here referred to, for convenience, by the cardinal directions of the compass—North, South, East and West. Only the Center zone will contain hexagonal key elements. The Center zone can contain all hexagonal key elements or all rectangular key elements, and will avoid any mixture of the two. The purpose of the bordering zones is to provide a buffer of rectangular key elements (active or not) between the Center zone and the edges of the keyboard. Each border area is optional for a particular keyboard layout. For example, if the keyboard is wide (or in landscape format), then the East and West border areas are used to contain keys which are not or cannot be accommodated in the Center zone, and the North and South border zones are unused. If the keyboard is tall (or in portrait format), then the North and South areas are used instead of East and West.

As suggested, one advantage of the implementation here described is that it also supports conventional rectangular keyboards. Rectangular soft keyboards are necessary for some applications such as phone number pads, data number pads, and calendars. In these cases, users are accustomed to a rectangular layout. Also, some users enjoy the freedom to choose between rectangular and hexagonal keyboards for text entry.

The above implementation supports a rectangular keyboard by using the Rectangle Plane exclusively and leaving the Center Plane empty. This type of keyboard should support "extended" rectangular keys, similar to the extended hexagonal keys, so that a key can be wider than one column. By the extensive use of extended keys, a rectangular keyboard can be staggered like a conventional "QWERTY" keyboard. Hexagonal keyboards are naturally staggered.

The technology which has been described is applicable not only to soft keys, but also to other selectable items displayed in densely packed arrays such as icons, hypertext links, and so forth. Examples of other systems in which the keyboard of this invention will have utility are shown and described in U.S. Pat. No. 5,539,479 issued 23 Jul., 1996, assigned to common ownership with the invention here described, and to which the interested reader is referred.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer comprising:
   a housing sized to be held in and manipulated by the hand of a user;
   a processor mounted within said housing for processing digital data;
   memory mounted within said housing for storing digital data and coupled to said processor;
   a display mounted in said housing coupled to said processor and said memory for displaying information derived from digital data processed by said processor;
   an input digitizer mounted in said housing and overlaying said display, said input digitizer being coupled to said processor for enabling input of digital data by a user; and
   a control program stored in said memory accessible by said processor for directing the processing of digital data by said processor;
   said control program and said processor cooperating, when said control program is executing on said processor, in displaying a keyboard formed by a plurality of adjoining hexagonally shaped cells, each cell defining a selectable input.

2. A mobile client computer according to claim 1 wherein said display is oriented in use with a vertical display axis and a horizontal display axis and further wherein said plurality of hexagonally shaped cells are displayed in an orientation of vertices aligned vertically.

3. A mobile client computer according to claim 1 wherein said control program and said processor cooperate, when said control program is executing on said processor, in displaying a keyboard formed by a plurality of adjoining hexagonally shaped cells and at least one rectangularly shaped cell, each of said cells defining a selectable input.

4. A mobile client computer according to claim 1 wherein said control program and said processor cooperate, when said control program is executing on said processor, in displaying a keyboard formed by a plurality of adjoining regular hexagonal cells and at least one extended hexagonal cell, each of said cells defining a selectable input.

5. A mobile client computer according to claim 1 wherein said control program and said processor cooperate, when said control program is executing on said processor, in defining a plurality of cells bounding the outer perimeter of the displayed keyboard, said perimeter bounding cells precluding input.

6. A mobile client computer according to claim 1 wherein said control program and said processor cooperate, when said control program is executing on said processor, in displaying a keyboard as called by an application program.

7. A mobile client computer according to claim 1 wherein said control program and said processor cooperate, when said control program is executing on said processor, in displaying a keyboard at all times during use of the computer.

8. A mobile client computer according to claim 1 wherein said control program and said processor cooperate, when said control program is executing on said processor, in displaying a keyboard occupying a minor portion of the area available on said display.

9. A mobile client computer according to claim 1 wherein said control program and said processor cooperate, when said control program is executing on said processor, in displaying a keyboard occupying a major portion of the area available on said display.

10. A computer comprising:
    a housing;
    a processor mounted within said housing for processing digital data;
    memory mounted within said housing for storing digital data and coupled to said processor;
    a display coupled to said processor and said memory for displaying information derived from digital data processed by said processor; and
    a control program stored in said memory accessible by said processor for directing the processing of digital data by said processor;
    said control program and said processor cooperating, when said control program is executing on said processor, in displaying on said display a keyboard formed by a plurality of adjoining hexagonally shaped cells, each defining a selectable input.

11. A computer according to claim 10 wherein said display is oriented in use with a vertical display axis and a horizontal display axis and further wherein said plurality of hexagonally shaped cells are displayed in an orientation of vertices aligned vertically.

12. A computer according to claim 10 wherein said control program and said processor cooperate, when said control program is executing on said processor, in displaying a keyboard formed by a plurality of adjoining hexagonally shaped cells and at least one rectangularly shaped cell, each of said cells defining a selectable input.

13. A computer according to claim 10 wherein said control program and said processor cooperate, when said control program is executing on said processor, in displaying a keyboard formed by a plurality of adjoining regular hexagonal cells and at least one extended hexagonal cell, each of said cells defining a selectable input.

14. A computer according to claim 10 wherein said control program and said processor cooperate, when said control program is executing on said processor, in defining a plurality of cells bounding the outer perimeter of the displayed keyboard, said perimeter bounding cells precluding input.

15. A computer according to claim 10 wherein said control program and said processor cooperate, when said control program is executing on said processor, in displaying a keyboard as called by an application program.

16. A computer according to claim 10 wherein said control program and said processor cooperate, when said control program is executing on said processor, in displaying a keyboard at all times during use of the computer.

17. A computer according to claim 10 wherein said control program and said processor cooperate, when said control program is executing on said processor, in displaying a keyboard occupying a minor portion of the area available on said display.

18. A computer according to claim 10 wherein said control program and said processor cooperate, when said control program is executing on said processor, in displaying a keyboard occupying a major portion of the area available on said display.

19. A display generating system comprising:
a housing;
a processor mounted within said housing for processing digital data;
memory mounted within said housing for storing digital data and coupled to said processor;
said processor and said memory cooperating in supplying digital data driving a display of visual images; and
a control program stored in said memory accessible by said processor for directing the processing of digital data by said processor;
said control program and said processor cooperating, when said control program is executing on said processor, in supplying digital data driving a display of a keyboard formed by a plurality of adjoining hexagonally shaped cells, each cell defining a selectable input.

20. A system according to claim 19 wherein the display of a keyboard is oriented in use with a vertical display axis and a horizontal display axis and further wherein said plurality of hexagonally shaped cells are displayed in an orientation of vertices aligned vertically.

21. A system according to claim 19 wherein said control program and said processor cooperate, when said control program is executing on said processor, in supplying digital data driving a display of a keyboard formed by a plurality of adjoining hexagonally shaped cells and at least one rectangularly shaped cell, each of said cells defining a selectable input.

22. A system according to claim 19 wherein said control program and said processor cooperate, when said control program is executing on said processor, in supplying digital data driving a display of a keyboard formed by a plurality of adjoining regular hexagonal cells and at least one extended hexagonal cell, each of said cells defining a selectable input.

23. A system according to claim 19 wherein said control program and said processor cooperate, when said control program is executing on said processor, in defining a plurality of cells bounding the outer perimeter of the displayed keyboard, said perimeter bounding cells precluding input.

24. A system according to claim 19 wherein said control program and said processor cooperate, when said control program is executing on said processor, in supplying digital data driving a display of a keyboard as called by an application program.

25. A system according to claim 19 wherein said control program and said processor cooperate, when said control program is executing on said processor, in displaying a keyboard at all times during use of the system.

26. A system according to claim 19 wherein said control program and said processor cooperate, when said control program is executing on said processor, in supplying digital data driving a display of a keyboard occupying a minor portion of the area available for the display.

27. A system according to claim 19 wherein said control program and said processor cooperate, when said control program is executing on said processor, in suppplying digital data driving a display of a keyboard occupying a major portion of the area available for the display.

28. A mobile client computer comprising:
a housing sized to be held in and manipulated by the hand of a user;
a processor mounted within said housing for processing digital data;
memory mounted within said housing for storing digital data and coupled to said processor;
a display mounted in said housing coupled to said processor and said memory for displaying information derived from digital data processed by said processor;
an input digitizer mounted in said housing and overlaying said display, said digitizer being coupled to said processor and enabling input of digital data by a user; and
a control program stored in said memory accessible by said processor for directing the processing of digital data by said processor;
said control program and said processor cooperating, when said control program is executing on said processor, in displaying a keyboard formed by a plurality of adjoining cells, each defining a selectable input;
said control program and said processor cooperating, when said control program is executing on said processor, in defining a rectangular plane for key definition and input and a center plane for key definition and input;
said control program and said processor cooperating, when said control program is executing on said processor, in allowing a user of the computer to select a display of a keyboard formed by adjoining rectangular cells and a keyboard formed by adjoining hexagonal cells.

29. The mobile client computer as defined in claim 28, wherein the user of the computer can select a display of a keyboard formed both by adjoining rectangular shaped cells and adjoining hexagonally shaped cells.

30. A computer comprising:
a housing;
a processor mounted within said housing for processing digital data;
memory mounted within said housing for storing digital data and coupled to said processor;
a display coupled to said processor and said memory for displaying information derived from digital data processed by said processor; and
a control program stored in said memory accessible by said processor for directing the processing of digital data by said processor;
said control program and said processor cooperating, when said control program is executing on said processor, in displaying on said display a keyboard formed by a plurality of adjoining cells, each defining a selectable input;
said control program and said processor cooperating, when said control program is executing on said processor, in defining a rectangular plane for key definition and input and a center plane for key definition and input;
said control program and said processor cooperating, when said control program is executing on said processor, in allowing a user of the computer to select between display of a keyboard formed by adjoining rectangular cells and a keyboard formed by adjoining hexagonal cells.

31. The computer as defined in claim 30, wherein the user of the computer can select a display of a keyboard formed both by adjoining rectangular shaped cells and adjoining hexagonally shaped cells.

32. A computer comprising:

a housing;

a processor mounted within said housing for processing digital data;

memory mounted within said housing for storing digital data and coupled to said processor;

a display coupled to said processor and said memory for displaying information derived from digital data processed by said processor; and an input device coupled to said processor for manual entry by a user of data to be processed by said processor, said input device including a keyboard defined by a grid of interlocking keys, the grid being formed by a plurality of columns and rows of adjoining hexagonally shaped cells, each cell defining a selectable input;

said adjoining hexagonally shaped cells being arrayed in the plurality of columns and the plurality of rows to define the grid of interlocking keys, wherein the keys of the grid have individual annotations corresponding to the selectable inputs for each cell for generating words for displaying on the display.

33. The computer according to claim 32 wherein each of said plurality of adjoining hexagonally shaped cells is formed as an outline around a center and the centers of ones of said cells in one row are arranged along a line spaced from a line crossing the centers of cells in an adjacent row by a distance less than the height of said cells in said one row.

34. The computer according to claim 32 wherein each of said plurality of adjoining hexagonally shaped cells is formed as an outline around a center and the centers of ones of said cells in one column are arranged along a line spaced from a line crossing the centers of cells in an adjacent column by a distance less than the height of said cells in said one column.

35. A computer according to claim 32 wherein said plurality of adjoining hexagonal cells are of a common size and congruent configuration.

* * * * *